3,336,107
DEHYDRATION OF MAGNESIUM CHLORIDE

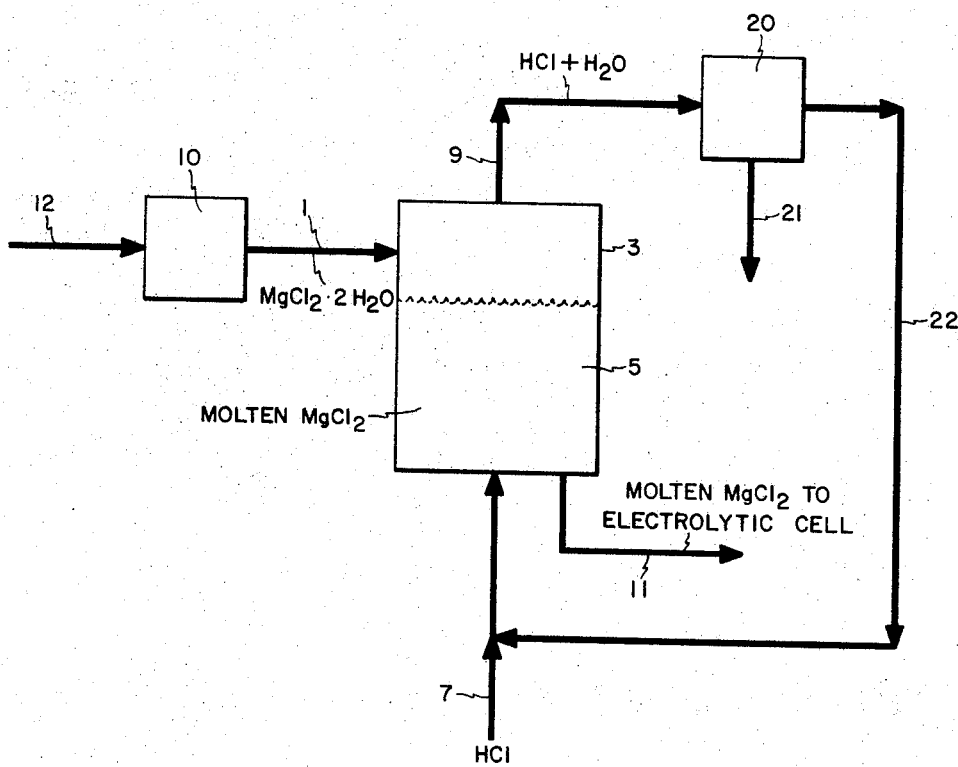

Charles Newton Kimberlin, Jr., Baton Rouge, La., assignor to Esso Research and Engineering Company, a corporation of Delaware
Filed Mar. 25, 1965, Ser. No. 442,766
3 Claims. (Cl. 23—91)

The present invention is concerned with the dehydration of magnesium chloride so as to produce anhydrous magnesium chloride which may be further processed by means of an electrolytic cell. The invention is specifically concerned with the dehydration of magnesium chloride by the use of an integrated process which in essence uses a molten anhydrous bed of magnesium chloride in conjunction with hydrogen chloride.

It is known in the art that naturally occurring magnesium chloride generally contains associated therewith about 6 molecules of water ($MgCl \cdot 6H_2O$). It is also known in the art that by general dehydration processes it is possible to remove about 4 molecules of water without securing undesirable side reactions. However, if further dehydration is continued by known techniques to remove the remaining 2 molecules of water, undesirable side reactions occur such as the formation of magnesium hydroxy chloride, magnesium oxide and hydrochloric acid.

It has now been discovered that if an integrated process is used which comprises the use of a molten bed of magnesium chloride in conjunction with hydrochloric acid, a high quality anhydrous magnesium chloride product is secured. The process of the present invention may be fully understood by reference to the drawing illustrating one embodiment of the same. Referring specifically to the drawing, hydrous magnesium chloride is introduced into initial dehydration zone 10 by means of line 12. The magnesium chloride introduced into zone 10 contains about 6 molecules of water of hydration. In zone 10 the hydrous magnesium chloride is partially dehydrated, preferably by spray drying to produce a product of magnesium chloride powder containing from 1½ to about 2 molecules of water of hydration. This magnesium chloride ($MgCl_2 \cdot 2H_2O$) powder is then passed by means of line 1 into reaction zone 3 which contains a molten mass 5 of anhydrous magnesium chloride. It is greatly preferred that the powder be distributed on the surface of the molten magnesium chloride. The temperature in zone 3 is maintained in a range from about 750° C. to 850° C., preferably about 775° C. The pressure in zone 3 is in the range from about 0 to 10 p.s.i.g., preferably about 5 p.s.i.g.

Under these conditions, the remaining water of hydration immediately flashes off and is removed overhead by means of line 9. Also under these conditions some hydrolysis of the magnesium chloride occurs to produce magnesium oxide.

In accordance with the present invention, this magnesium oxide is reconverted to magnesium chloride by the introduction of gaseous hydrogen chloride which is introduced by means of line 7 and is bubbled through the molten mass of magnesium chloride. The amount of HCl used is in the range of 1 to 10, such as 1 to 4 moles per mole of $MgCl_2 \cdot 2H_2O$ feed, preferably about 2 moles of HCl per mole of $MgCl_2 \cdot 2H_2O$ feed. Both the HCl and the $MgCl_2 \cdot 2H_2O$ are preferably introduced continuously, but they can be introduced intermittently, if desired.

The water and hydrogen chloride are passed overhead by means of line 9 and introduced into a drying zone 20 where the water is removed by means of line 21 while the dry hydrogen chloride is preferably recycled to zone 3 by means of line 22. This drying zone may be of any conventional type but is preferably a scrubber in which HCl is contacted with sulfuric acid, or other equivalent agent. The sulfuric acid may be dehydrated and recycled to zone 20.

The molten anhydrous magnesium chloride is removed from the bottom of zone 3 by means of line 11, cooled by suitable means and further processed, preferably by means of an electrolytic cell.

The process of the present invention may be more fully understood by the following example illustrating the same.

Example 100 grams of anhydrous magnesium chloride containing about 10 grams of magnesium oxide was heated to 800° C. A cloudy liquid mass was formed. During the course of 90 minutes a total of 24 liters of HCl was bubbled through the liquid mass. At the end of this time all of the magnesium oxide had been converted to magnesium chloride and the molten mass was clear.

Thus it is apparent that by the use of HCl in the molten bath, the magnesium oxide is converted to magnesium chloride to secure a substantially pure product of magnesium chloride free of water.

What is claimed is:

1. Process for the removal of the water of hydration from magnesium chloride containing about 6 molecules of water of hydration which comprises removing about 4 molecules of the water in an initial stage to produce a powder; thereafter introducing the magnesium chloride powder containing about 2 molecules of water of hydration into a zone containing anhydrous molten magnesium chloride which is maintained at a temperature in the range from about 750° C. to 850° C., the powder being introduced on the surface of said molten magnesium chloride whereby the water of hydration of said powder is removed overhead and some magnesium oxide forms; introducing hydrogen chloride into the bottom of said molten bath whereby the magnesium oxide as it falls through said molten bath is converted to magnesium chloride; removing excess hydrogen chloride overhead with the water vapor and removing molten anhydrous magnesium chloride from the bottom of said molten bed.

2. Process as defined by claim 1 wherein the pressure maintained in said zone containing molten magnesium chloride is in the range from about 0 to 10 lbs. per square inch gauge and wherein from about 1 to 4 moles of hydrogen chloride is added per mole of magnesium chloride powder added.

3. Process as defined by claim 2 wherein the excess hydrogen chloride removed overhead with the water vapor is handled in a manner to remove said water vapor and then recycled to the bottom of said molten bath.

References Cited

UNITED STATES PATENTS

| | | | |
|---|---|---|---|
| 1,896,406 | 2/1933 | Heath | 23—91 |
| 2,406,935 | 9/1946 | Wood et al. | 23—91 X |
| 2,417,772 | 3/1947 | Marek | 23—91 |
| 3,067,006 | 12/1962 | Ebert et al. | 23—91 |

FOREIGN PATENTS

| | | |
|---|---|---|
| 345,518 | 3/1931 | Great Britain. |
| 457,588 | 12/1936 | Great Britain. |
| 518,893 | 3/1940 | Great Britain. |

OSCAR R. VERTIZ, *Primary Examiner.*

EDWARD STERN, *Assistant Examiner.*